INVENTOR.
Siegfried Lubinski
BY
Watson, Cole, Grindle & Watson
Attys.

United States Patent Office 3,397,596
Patented Aug. 20, 1968

3,397,596
AUTOMATIC CONTROL FOR CHANGE-SPEED
GEARS, ESPECIALLY FOR MOTOR VEHICLES
Siegfried W. L. Lubinski, Wolfsburg, Germany, assignor
to Die Volkswagenwerk Aktiengesellschaft, Wolfsburg,
Hannover, Germany, a corporation of Germany
Filed Jan. 17, 1964, Ser. No. 338,437
Claims priority, application Germany, Jan. 18, 1963,
V 23,526
9 Claims. (Cl. 74—731)

The invention relates to a control for change-speed gears, especially for motor vehicles with a hydrodynamic preshifting element, for example a hydraulic torque converter, in which the difference in the number of revolutions between the pump and turbine is utilized for controlling the shifting of the gear parts.

It is already known in connection with such a gear to use a hydraulically actuated friction clutch set for slight continuous slip, in which the hydraulic pressure is produced by a pump and changed by the speed difference between the clutch halves, so as to initiate gear changes.

The known arrangement, apart from the wear caused by the continuous slip, is open to the objection that, in view of the fact that only slight slip is here possible, a friction clutch is in the transition stage between static and sliding friction, with the result that, owing to fluctuations in the coefficient of friction, accurate shift control is not possible. Moreover, a centrifugal governor is also necessary.

Another arrangement is likewise known in which two sets of vane wheels are connected up with the pump and turbine of a hydraulic torque converter. The speed difference between the pump and turbine of the converter therefore acts as a greater or lesser pressure on a control piston arranged in the compartment accommodating the sets of vane wheels. A rate of flow of the hydraulic medium is not provided for. An objection to this arrangement is that, by this hydrodynamic arrangement only very small and also no well defined differences in pressure dependent upon the difference in speed can be produced, which results in very inaccurate shifting. In addition, an auxiliary amplifier arrangement is necessary. Moreover, the pressure produced is dependent upon the velocity head.

The object of the invention is to produce an automatic control, particularly for change-speed gears of motor vehicles, which not only avoids the disadvantages of the known arrangements but also enables the best possible adaptation of the gear changing to the torque characteristic of the engine and is composed of the fewest possible number of constructional parts.

According to the invention, the pump and turbine of the hydrodynamic preliminary switching element is connected with the housing and the driving shaft of a positive feed hydrostatic pump which supplies at least one circuit to which servo arrangements are connected for controlling and/or actuating the shifting elements. The pump aggregate preferably supplies two separate circuits one of which serves for the shift control of the gear parts and the other for applying mechanical brakes or engaging clutches. Thus a shift circuit and a pressure applying circuit are produced.

Control arrangements can also be provided in the circuit system for reversing the direction of flow when the turbine rotates at a higher speed than the pump of the transformer.

At the same time it is advantageous to use as hydrostatic pump the servo pump of the automatic shifting device which is present in any case, so that an additional servo pump is not required.

The leakage points, present in any case in the pressure pipes due to the tolerances in manufacture, can be used for leading off the hydraulic medium.

Throttle nozzles can also be provided in these circuits for maintaining constant the pressure head due to the unavoidable leakages in the moved joints in relation to the pump delivery. These nozzles can serve for the arbitrary changing of pressure, whereby the individual shifting operations can be initiated or suppressed in advance. It is likewise possible with these nozzles to adapt the pressure forces to the torque of the engine through the intermediary of the throttle valve position in the carburetor.

In the conduit system for the shift control of the servo piston, pressure reservoirs can be provided, which are capable of effecting a compensation in the event of the accelerator pedal being depressed too energetically resulting in a sudden gear change.

As compared with the conventional automatic gears which require a large number of control slide valves, the arrangement according to the invention possesses the advantage that the gas pressure slide valve and above all the sensitive speed regulator can be dispensed with. The number of slide valves in the valve box can, under certain circumstances also be reduced to a single valve.

The gear arrangement according to the invention also enables an automatic torque modulation in that the pressure forces to be produced on the control elements are also great in the case of great speed differences, that is considerable slip in the converter which means high engine torque. The arrangement possesses the further advantage that the slip of the converter becomes operative before the change in torque on the converter acts on further gear parts. The slip of the converter which acts on the gear parts of the hydrostatic pump connected directly with it, results in an immediate reaction of the individual frictional shifting elements.

Another advantage consists in the the so-called overlap, that is the time during the change-over during which the gear parts of several speeds are used at the same time, can be very accurately determined by suitably dimensioning the piston measurements of the two coordinated control elements, so that return springs, which are frequently difficult to accommodate, can be dispensed with.

The construction of the overlapping operation without return springs therefore enables the time of overlap to be adapted to the engine load in the most simple manner owing to the oil pressure in the pressure circuit being dependent upon the converter slip.

The needles of the throttle nozzles in the shift and pressure circuits may be made from expansible metal so that, apart from being adjustable, they can also effect an automatic change in the cross-section of the nozzle passage dependent upon the prevailing ambient temperature, that is respond to the changes in the viscosity of the oil due to fluctuations in temperature when in operation. Throttle nozzles can be provided in both circuits for compensating tolerances in manufacture which serve for adjustment.

As high oil temperatures may occur when starting up, an oil cooler can be provided beyond the safety valve in the pressure circuit, so that only the oil conducted off owing to the high starting-up pressure, will pass through the cooler. Under normal running conditions and low pressures in the converter, the cooler is cut-out.

As, when the vehicle is stationary and the engine is running and also when the engine is stopped and the turbine moved by the rolling vehicle, the hydrostatic pump produces pressure owing to the slip in the converter, with the result that the converter is filled, the present arrangement, contrary to the known converter gears, is suitable for starting up the engine by entrainment without any secondary pump.

The entrainment is initiated by the forces of inertia of the accelerated masses and the frictional and adhesive forces in the gear. It can be assisted by the mechanical operation of the gear parts, for example the band brake.

An embodiment of the invention is hereinafter described by way of example with reference to the accompanying drawings, without the invention being restricted to this construction.

Figure 4:
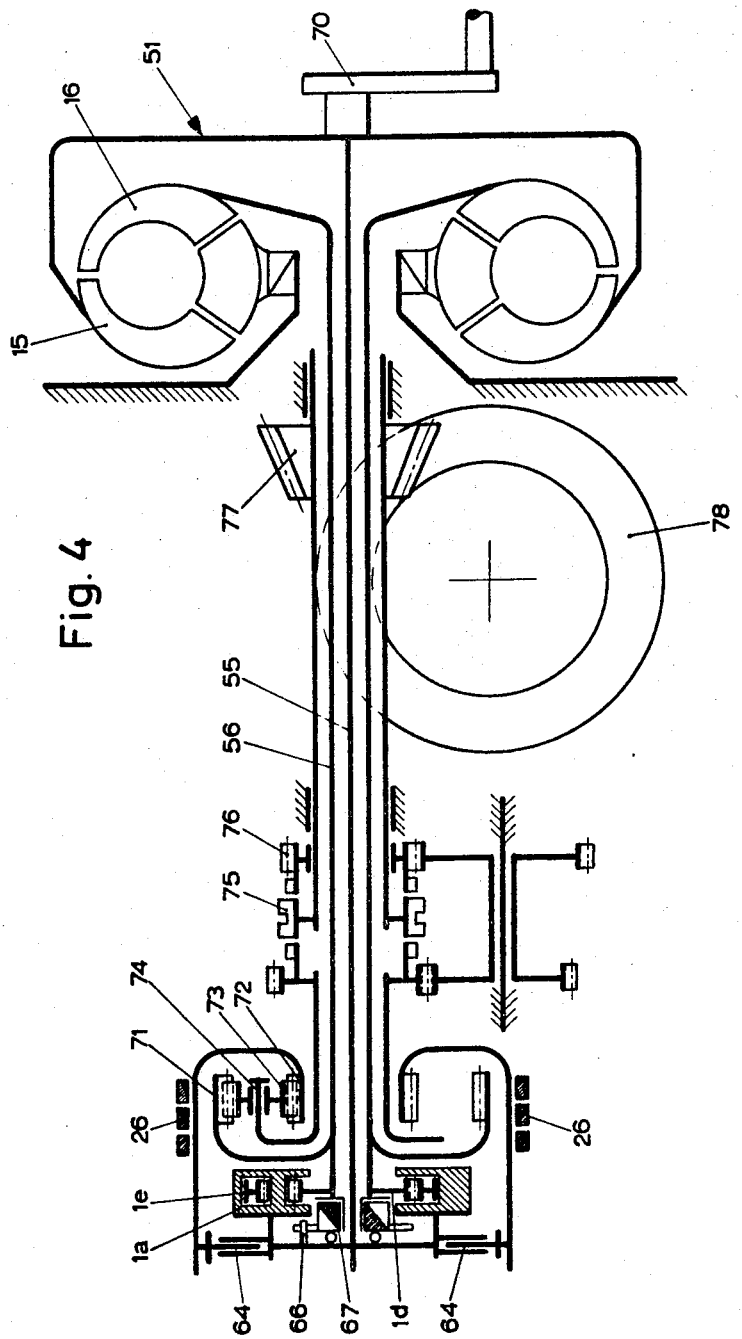
Figure 5:
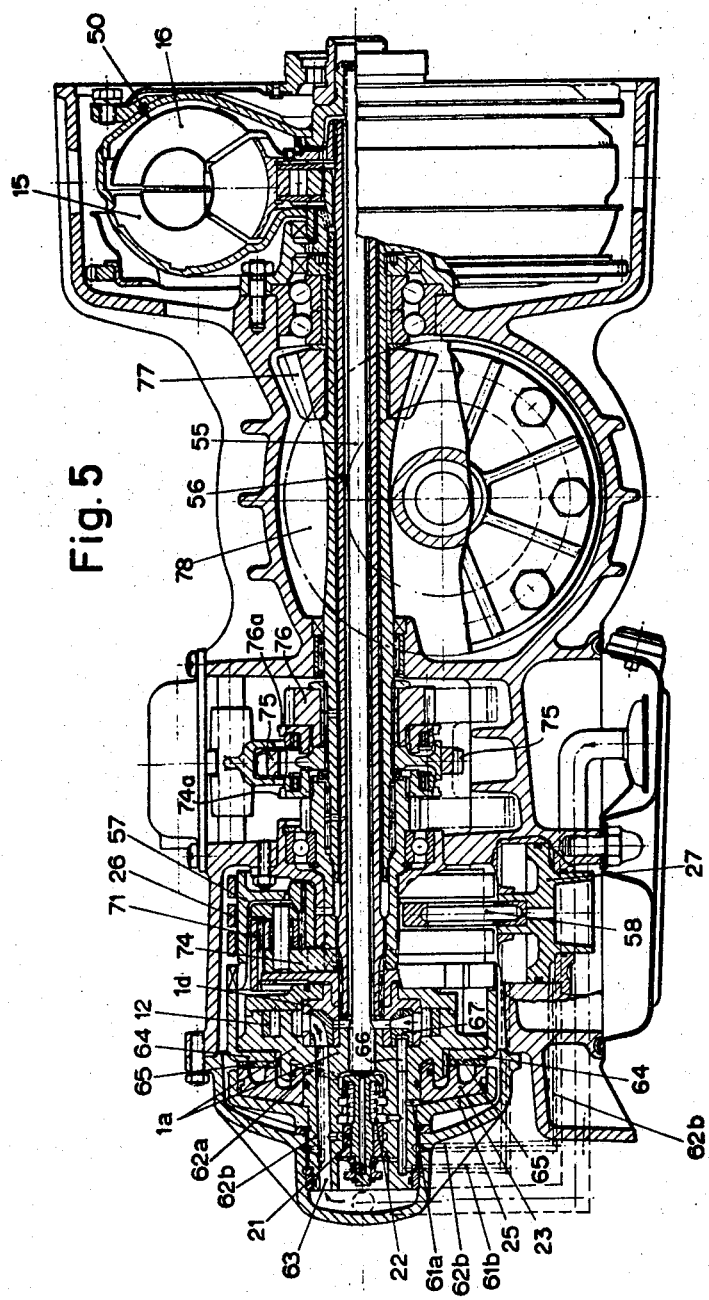

FIG. 4 an example of a lay-out of a gear equipped with the arrangement according to the invention, and FIG. 5 a constructional drawing of the arrangement shown in FIG. 4.

Figure 1:
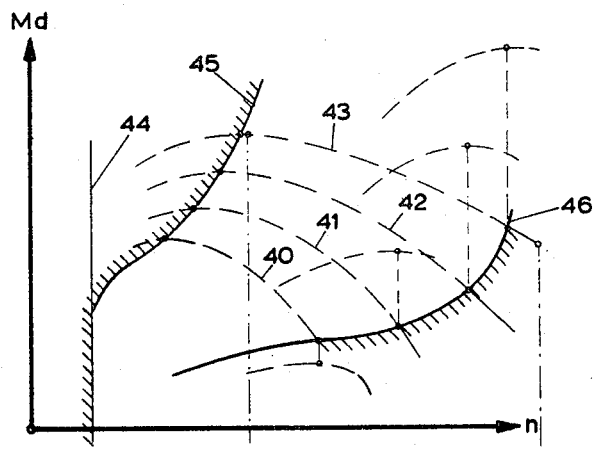
FIG. 1 is a chart in which the torque of the Otto engine is shown over the number of revolutions and in which the throttle valve positions are indicated as parameter.

In FIG. 1 the torque Md of an internal combustion engine is traced above the number of revolutions n thereof. Different characteristic curves 40, 41, 42 and 43 are produced. The idle-running limit is shown as parallel to the ordinate and designated by 44. The characteristic field is bordered by two further curves 45 and 46, the curves 45 being the upper limit at which the engine runs at the lowest practical speed before "stalling." The time for shifting down is located here. The lower limit 46 is the curve of maximum relative performance. If the engine rotates quicker, the performance will not be higher. The engine comes into a zone of uneconomical higher specific consumption and the time for changing over to a higher gear is reached so as not to subject the engine to too great mechanical stress unnecessarily.

Figure 2:
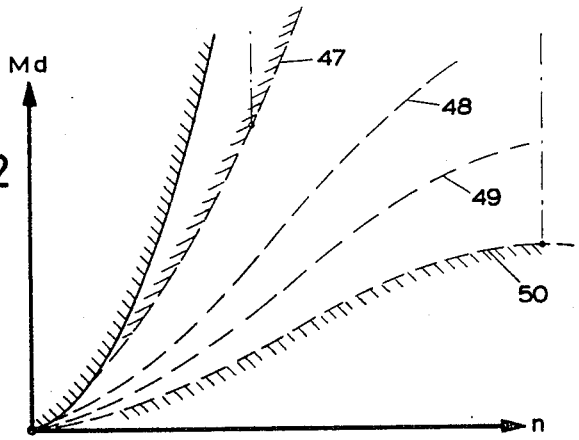
FIG. 2 is a chart in which torque curves are traced above the number of revolutions of the converter. The parameter is in this case the slip or speed difference between the pump and turbine of the converter.

FIG. 2 shows the characteristic curves for the torque dependent upon the number of revolutions of the converter. Curves 47, 48, 49 and 50 are characteristic curves, the difference in the number of revolutions, that is the absolute slip between the pump and turbine of the converter being indicated as parameter. In the case of great differences in speed (curve 47), that is high slip losses, a change down appears also advisable on the converter side.

As the same scale is chosen for both the charts shown in FIGS. 1 and 2. It will be seen that the change or shift limits (curves 45 and 46 of FIG. 1) coincide to a great extent in tendency with the change or shift limits of the converter (curves 47 and 50 of FIG. 2). As a result, the pressures applied in the control circuit for controlling the shift functions must be associated as closely as possible with the absolute differences in the number of revolutions of the hydraulic converter.

The invention is based on these considerations in that the housing and driving shaft of a positive feed, that is a hydrostatic pump, are connected up with the pump and turbine of the hydraulic converter, and its capacity is directly proportional to the difference in the number of revolutions.

Figure 3:
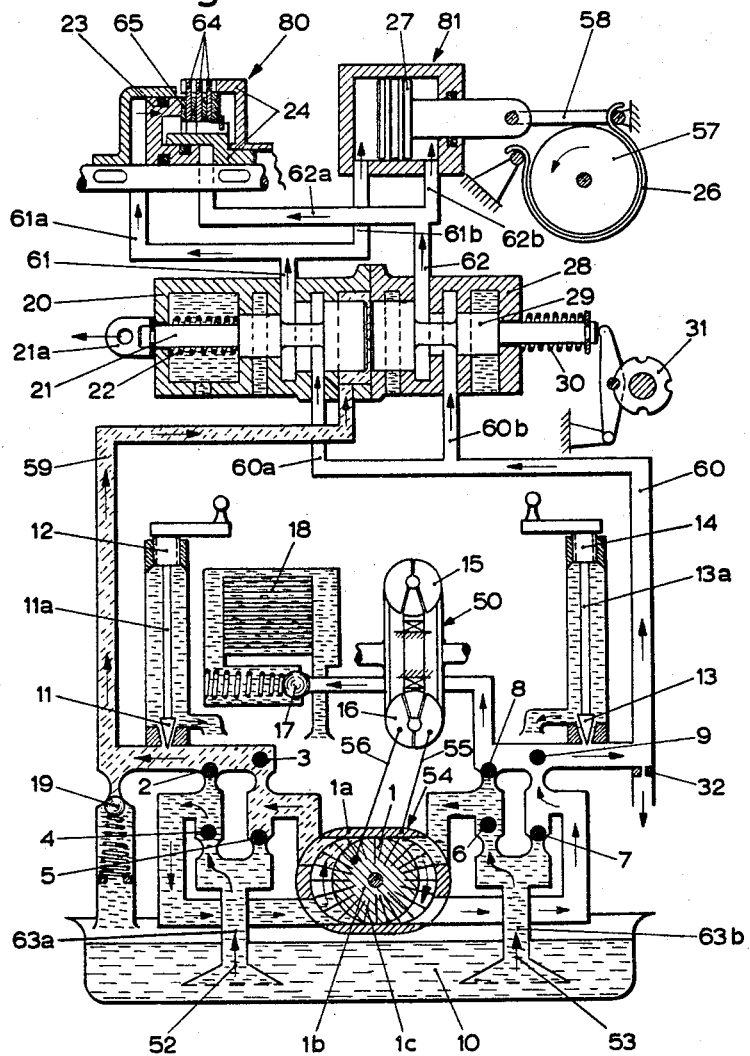
FIG. 3 is a general diagram of the arrangement according to the invention in which the hydrostatic pump connected with the pump and turbine of the converter feeds into two separate hydraulic circuits.

A general diagrammatic illustration of such a change-speed arrangement is shown in FIG. 3, wherein the rotor 1b of a hydrostatic pump 54 is connected up with the turbine 16 of a hydraulic converter 50 and the housing 1a of this pump with the pump 15 of the converter 50. The pump 54 delivers into two separate hydraulic circuit systems, namely into a circuit by which the pressure for the individual shift elements of the gear is applied and into a shifting circuit for initiating the actual changing operations. The latter circuit is hatched to distinguish it from the pressure circuit. The oil fed from the oil sump 10 in the direction of the arrows 52 and 53 passes through the change-over or reversing valves 2 to 9 which, in the case of reversal in the direction of rotation of the pump 54, serve for maintaining constant the direction of feed as a result of negative slip of the converter. In the shifting circuit a safety valve 19 is installed and in the pressure exerting circuit a safety valve 17. Beyond the safety valve 17 an oil cooler may be provided which cools the heated oil passing out under pressure from the converter 50 and returns it to the cooling sump 10. Additional valves 11 and 13 may also be provided both in the pressure exerting circuit as well as in the shifting circuit and actuated by means of handles 12 and 14 respectively. The nozzle needles 11a and 13a of these valves may be made from expansible metal so that the temperature of the oil surrounding these needles will effect a change in the length of the needles and consequently an opening or closing of the conical seats. By this arrangement a compensation of viscosity is established because at higher temperatures the valves 13 and 11 will be closed more, with the result that the drop in pressure caused by the temperature will be compensated in the conduit systems. The shifting or changing circuit and the pressure exerting circuit lead to a servo-control which, in the example illustrated, consists of a brake and a clutch in known manner.

The servo-control comprises a shifting slide valve cylinder 20 in which the stepped shifting piston 21 is accommodated. The cylinder 20 is combined and forms an aggregate with the housing 28 of a brake interrupter slide valve 29. The shifting piston 21 may be provided with an eye 21a accessible from outside so that it can be actuated like a so-called low pull element. The interrupter slide valve 29 may also be actuated from outside, for example by means of a notched piston 21 to enable any mechanical supplementary speeds to be engaged. Springs 22 and 30 can effect the return movement.

The pressure exerting conduit 60 of the pressure circuit is divided into two sections 60a and 60b, which lead to the shifting piston 21 and the interrupter slide valve 29 respectively. The shifting piston is acted upon through the conduit 59 of the shifting circuit so that the hydraulic medium of the pressure exerting circuit is either fed to the circuits 61 and 62 which lead to the clutch 80 and brake 81 respectively or is cut-off from these circuits.

The circuit 61 which is under the influence of the shifting piston 21 is divided into a clutch closing section 61a and a brake operating section 61b. The conduit 62 coming from the interrupter slide valve 23 branches into a clutch disengaging section 62a and a brake engaging section 62b. But in the event of pressure in either of the conduits 61 or 62 two opposite movements are imparted simultaneously to both shifting members.

The brake has a brake piston 27 which acts on a link system 58 in order to actuate a band brake 26 which encircles a drum 57.

The clutch piston 23 is located in a clutch cylinder 23. The clutch discs 64 are actuated through the intermediary of a pressure plate 65 acted upon by the clutch piston 23.

FIG. 4 is a diagrammatic view of the gear layout of a constructional form for the gear arrangement according to the invention.

The references of like parts correspond to those of FIG. 3.

On the righthand side of the drawing, a converter composed of a pump 15 and a turbine 16 is shown diagrammatically, the pump 15 being connected with the housing 1a of a hollow gear wheel pump through the intermediary of a central shaft 55. This central shaft 55 extends through a hollow shaft 56 which in turn is connected with the inner gear wheel 1d of the hydrostatic pump. The toothing 1e of the hollow gear wheel pump which corresponds to the feed vanes 1e of FIG. 3, is also indicated. At the end of the hollow shaft 56 a reversing slide valve 67 is arranged, according to one suggestion, which, like the ball valve system 2 to 9 illustrated diagrammatically in FIG. 3, serves for producing a positive pressure in the supply conduits 59 and 60 of the hydrostatic pump even in the case of negative slip.

The clutch 64 and the band brake with double lapping 26 are likewise shown diagrammatically on the gear side. FIG. 5 shows an example of a corresponding form of construction.

There the pump 15 is also connected by the central shaft 55 with the housing 1a of the hollow gear wheel pump in the gear wheel portion thereof. The turbine 16 is connected to the hollow shaft 56 and penetrates into the corresponding parts of the housing 1a. The hollow shaft 56 carries the inner toothed rim 1d of the hydrostatic pump.

The reversing or change-over slide valve 67 slides in the inner wheel 1d of the pump and is entrained by the frictional forces in the direction of rotation, its turning movement being limited by an abutment pin 66 so that in moving forward a passage is freed in the direction of feed whereas in moving backwards another passage is opened so that in any case a positive pressure is produced in the supply conduit of the hydrostatic pump. The same applies for the suction passages.

Arranged coaxially with the central shaft 55 is the shifting piston 21 one end of which extends to the outside and can there be provided with a so-called low pull element to be actuated by hand.

The shifting piston 21 controls the operation of the clutch and brake, the clutch piston 25 being acted upon through the clutch closing conduit section 61a on the one hand and through the clutch releasing conduit section 62a on the other hand. The brake piston 27 is acted upon through the brake applying conduit section 62b and relieved through the brake disengaging conduit section 62a.

The pressure plate 65 and the cup-shaped clutch disc 64 can also be seen in the drawing.

The arrangement illustrated in FIGS. 4 and 5 operates in the following manner:

The pump 15 and turbine 16 of the hydraulic torque converter 50 rotate with a slip caused by the bearing moment of rotation. The drive of the converter is effected thereby through the intermediary of the crank shaft 70. The sun-and-planet gear comprises a ring wheel 71, a sun wheel 72 and three planet wheels 73. It is obvious that the sun-and-planet gear may be of some other construction. The sun wheel 72 is acted upon by the band brake 26 and carries on the other side the clutch discs 64. The hollow shaft 56 is connected on one side with the outer ring wheel 71 and on the other side with the inner spur wheel 1d of the hydrostatic pump. The drive is effected by the planet wheel carrier 74 which is connected up with the bevel wheel 7 through the intermediary of a transmission 75, 76.

The slip between the pump 15 and turbine 16 of the converter, which is produced by the output torque acting on the output spur bevel wheel 78, causes a difference in speed between the housing 1a of the hollow spur-wheel pump and the inner toothed rim 1d. This difference in speed between the two pump parts results in a discharge into the pressure conduits connected to the pump. FIG. 5 shows that the pump sucks through a suction conduit 63 and then discharges into the brake and clutch engaging and disengaging conduit sections 61a, 61b and 62a, 62b respectively via the reversing cock 67 and the control or shifting slide valve 21.

As the shift slide valve is, as shown in FIG. 3, moved in accordance with the speed difference between the pump and converter and consequently loads the disengaging and engaging conduits of the clutch and brake, a shifting of the sun-and-planet gear is effected according to the slip of the converter.

The oil feed from the reversing slide valve 62 to the shifting piston 21 is effected by the tooth clearance due to the play at the head and base of the connecting toothing between the end of the central shaft 55 and the pump housing 1a. A second oil feed passage from the reversing slide valve 67 to the converter 50 is formed by the space between the central shaft 55 and the hollow shaft 56.

I claim:
1. Automatic change speed gear including a hydrodynamic element containing a pump impeller and a turbine wheel, comprising hydraulically operated shifting elements to effect the shifting of the change speed gear, a pressure line system to which said shifting elements are connected, at least one pump to deliver pressure to the line system through a fluid connection, said pump impeller being connected with one side of the pump, and the other side of the pump being connected with the turbine, said pressure line system being operatively connected with the shifting elements, and servo installations in said system being acted upon by the pressure in the line system and provided to control the hydraulically operated elements.

2. Automatic change speed gear, according to claim 1, in which reversing means and control devices are provided in the conduit systems for reversing the direction of flow when the turbine runs at a higher speed than the pump of the preshifting member.

3. Automatic change speed gear, according to claim 1, in which two separate conduit systems are provided, fed by one pump device of which one system serves for a shift control of gear parts and the other for operating said shifting elements and in which the system for the pump device includes two separate passages connected to suction and pressure sides of the pump and which each have two outlets one of which is connected for control to an oil sump and the other with the conduit systems, and in which valves are provided so arranged at the points of connection that the valves on the oil sump side open and close as a result of the flow pressure on the side remote from the sump and the valves on the conduit side open and close the admission to the conduits.

4. Automatic change speed gear according to claim 1, in which a slide valve is provided controlled by means of the conduit system for the shift control and by which the pressure oil of the pressure exerting circuit for the individual shifting members is fed and shut-off.

5. Automatic change speed gear according to claim 1, in which two separate pistons are provided operable by means of pressure in the shifting circuit in a slide valve cylinder, one piston being the actual shifting piston which serves at the same time as a clutch release, whereas the other serves as a brake release.

6. Automatic change speed gear according to claim 1, in which two separate pistons are provided operable by means of pressure in the shifting circuit in a slide valve cylinder, one piston being the actual shifting piston which serves at the same time as a clutch release, whereas the other piston serves as a brake release, the brake piston and clutch piston being double acting and without return springs.

7. Automatic change speed gear according to claim 1, in which nozzles are provided in the system for changing the pressure therein and of which at least one nozzle is a throttle nozzle and in which a nozzle needle is provided for the throttle nozzle and is composed of an expansible metal to compensate for a change of viscosity of the fluid.

8. In a power transmission mechanism with a hydrokinetic torque converter, a converter speed ratio sensitive pressure source comprising a first fluid displacement member drivably connected to driving portions of said mechanism, a second fluid displacement member cooperating with said first fluid displacement member, said second fluid displacement member being drivably connected to driven portions of said mechanism, passage means for distributing a pressure signal from said fluid displacement members to pressure sensitive portions of said mechanism, a multiple speed ratio gear system forming a part of said mechanism and adapted to define in part a torque delivery path from said driving member to said driven member, friction torque establishing devices for controlling the relative motion of elements of said gear system to establish different speed ratios in said gear system, said friction torque establishing devices adapted to respond to variations in the magnitude of said pressure signal to initiate speed ratio changes as the hydrokinetic speed ratio of said mechanism assumes a given value.

9. In a hydrokinetic power transmission mechanism comprising an impeller and a turbine situated in toroidal flow flow relationship, a positive displacement pump comprising relatively movable fluid displacement members, one fluid displacement member being connected to said impeller and the other fluid displacement member being connected to said turbine, means for supplying fluid under low pressure to said displacement members, passage means for delivering fluid displaced by said members upon relative movement thereof to fluid pressure sensitive portions of said mechanism, the fluid displaced by said members functioning as a pressure signal that is proportional in magnitude to the speed ratio of said mechanism, a multiple speed ratio gear system forming a part of said mechanism and adapted to define in part a torque delivery path from said driving member to said driven member, friction torque establishing devices for controlling the relative motion of elements of said gear system to establish different speed ratios in said gear system, said friction torque establishing devices being adapted to respond to variations in the magnitude of said pressure signal to initiate speed ratio changes as the hydrokinetic speed ratio of said mechanism assumes a given value.

References Cited
UNITED STATES PATENTS

| 2,373,453 | 4/1945 | Brunken | 74—731 |
| 2,603,984 | 7/1952 | Swift | 74—732 |

FOREIGN PATENTS

| 446,979 | 5/1936 | Great Britain. |

FRED C. MATTERN, Jr., *Primary Examiner.*

T. C. PERRY, *Assistant Examiner.*